United States Patent [19]

Lee

[11] Patent Number: 4,900,081

[45] Date of Patent: Feb. 13, 1990

[54] COVER FOR A CAR WITH MULTIPLE USE

[76] Inventor: Nam S. Lee, Kansuk JooKong Apt. 72-401, Kansuk-Dong 344-1, Namdong-Ku, Inchon, Rep. of Korea

[21] Appl. No.: 223,159

[22] Filed: Jul. 22, 1988

[30] Foreign Application Priority Data

Jul. 23, 1987 [KR] Rep. of Korea ........ UM-1987-11985

[51] Int. Cl.[4] .............................................. B60J 7/20
[52] U.S. Cl. ..................................... 296/136; 135/88
[58] Field of Search ........................ 296/136, 98, 161; 135/88, 87

[56] References Cited

U.S. PATENT DOCUMENTS

| | | | |
|---|---|---|---|
| 4,164,233 | 8/1979 | McAndrew | 296/136 |
| 4,519,644 | 5/1985 | Song | 296/136 |
| 4,727,898 | 3/1988 | Guma | 296/136 |
| 4,732,421 | 3/1988 | Ross et al. | 296/136 |

Primary Examiner—Robert R. Song
Attorney, Agent, or Firm—Spencer & Frank

[57] ABSTRACT

A multiple use cover for a car made of a plurality of individual truss modules flexibly connected with center pins, external pins and internal pins forming a scissors structure. Parallel major trusses are interconnected with transverse bars additionally used on the external pins of the some truss module. The external ends of both the flexible major trusses are coupled to fixing holes in a support beam with the use of fixing pins. The internal ends of the trusses are connected to elongate guide holes with the movable pins. The cover is connected to a height adjusting base and to a rotatable connecting frame. The rotatable connected frame is coupled to a fixing pillar which is fixed to the bottom of the trunk of a car.

12 Claims, 5 Drawing Sheets

COVER FOR A CAR WITH MULTIPLE USE

FIELD OF THE INVENTION

The present invention relates to a cover for a car with multiple uses, more specifically, a cover for a car with multiple uses which can be used to shield from the heat of direct sun in summer and to protect against frost in winter by covering over the car when parked and, if desired, the car cover can be used instead of a tent for camping in the field.

BACKGROUND OF THE INVENTION

Heretofore, a car cover used to generally protect a car, especially from direct sun light and frost has been made and used in various form.

An example of a well known car cover is one which directly covered the car with a thin sheet of material. Such a car cover only blocked light.

Another known car cover is one in which a sheet material is cut as wide as the width of a car and the rear end of this sheet is attached to a winding roller drum containing a winding roller spring. An automatic winding apparatus made by putting this structure into a case is mounted on the rear trunk of a car, and a hook means is supplied on the front edge of the cover sheet, for fixing the front end of the cover to the front of the car. When in use, the cover sheet is drawn out of the automatic winding apparatus and the front edge is fixed to the front of the car using the sheet to cover the body of the car. When not in use, the releasing of the fixing hook of the cover sheet causes the sheet to be wound automatically into the automatic winding drum.

The covers such as these have the disadvantage that it is not possible to avoid the overheating of the car body from sun light passing directly through cover sheet. This is because an interspace region for ventilation between the cover sheet and the car body cannot be formed to avoid the direct sun light phenomenon. Nevertheless, certain interspace region members have been attached to the cover sheet at a predetermined interval. However, this approach has the disadvantage that the interspace region is formed only adjacent to the area where the interspace member is attached and the formation of the interspace region elsewhere, if it occurred at all, was irregular. Further, the usual automatic winding device has the disadvantages of high manufacturing cost and frequent malfunction due to the complexity of the structure.

SUMMARY OF THE INVENTION

An object of the present invention is to provide a cover which is capable of covering the body of a car in a short period of time after parking, and is simple and easy to store by putting it into the car trunk before operating the car.

Another object of the present invention is to provide a cover whose length can be easily extended or constricted as much as desired.

A further object of the present invention is to provide a cover in which the cover's clearance height may be controlled.

Other objects and effects of this invention will be apparent from the following detailed description with reference to the accompanying drawings by way of example only and it should not be considered limiting in any sense.

These objects are accomplished by a car cover made of a plurality of trusses made of strong, light weight material. Ythe trusses have a scissors construction and are interconnected forming a major truss body. The major truss body is connected at each end to a support. When the cover is over the car body, an interspace region is formed between the car body and cover of a constant, uniform, stable height. The resulting ventilation is superior, due to the interspace region causing a delightful riding atmosphere even after a long period of parking. The car cover is effective by blocking direct conduction of hot sun light due to air ventilation provided. As well the cover protects the car from frost in the winter.

Further, the car cover's height is controlled by a height control bar and a rotatable connecting bar between the cover body and the support. Also the cover may be utilized as a camping tent by changing the inserting direction of the height control bar.

BRIEF DESCRIPTION OF THE DRAWINGS

In different figures, the same reference numerals represent the same part unless otherwise specified.

DETAILED DESCRIPTION OF THE PREFERRED EMBODIMENT

A cover according to the present invention is composed of the major body of a cover and a fixing device. The major body of the cover covers the car and the fixing device is used to store the major body of a cover within the back trunk of a car. The fixing device includes a height adjusting base and a rotatable connecting frame for intermediate connecting members which connect the fixing device and the major body of the cover.

Figure 1:
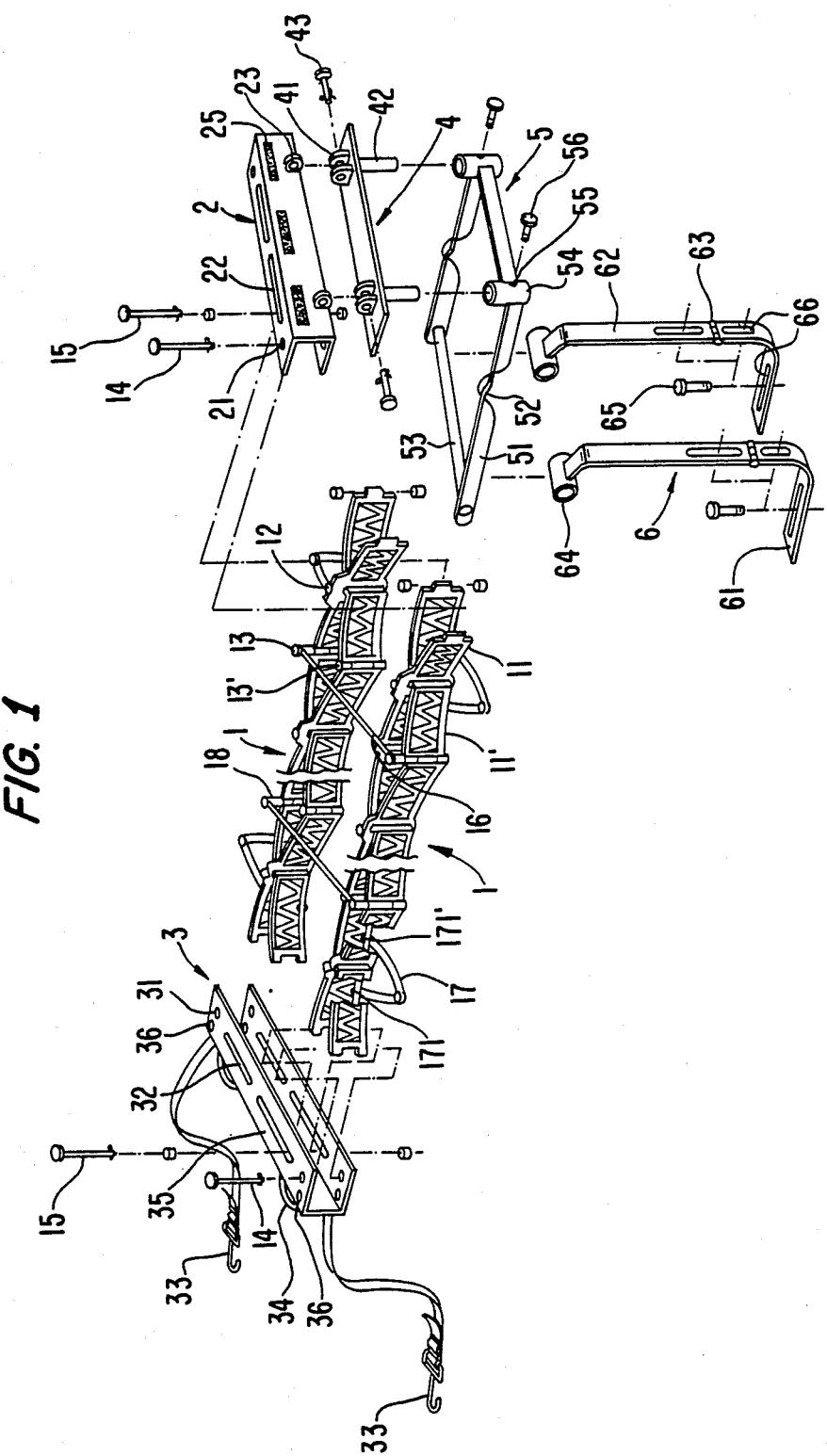
FIG. 1 shows an exploded perspective view of the flexible truss from which the cover sheet is removed.

In FIG. 1, the major body of a cover is composed of the flexible trusses positioned in parallel. Each end of the flexible trusses are connected to the front and rear support beams 2 and 3.

The flexible trusses are constructed to permit their length to be extended or constricted by scissors extension interconnection to movably connect a plurality of the truss modules 11, 11'. The truss modules are made of light and solid material (e.g., the synthetic resin or metal such as aluminum). Center pins 12, external pins 13 and internal pins 13' allow the truss modules to move relative to each other.

The truss modules 11, 11' can be made with a predetermined pattern. Mass production of truss modules is possible by injection or extrusion molding methods.

Figure 8:
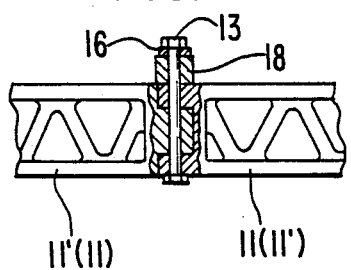
FIG. 8 is a fragmentary, elevational diagram showing the male and female trusses and a transverse bar connected with an external pin.
Figure 9:
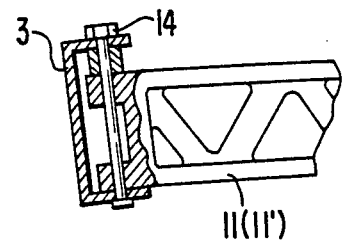
FIG. 9 is a fragmentary, elevational showing the front end of a truss connected to the front support of a car with a fixing pin.
Figure 10:
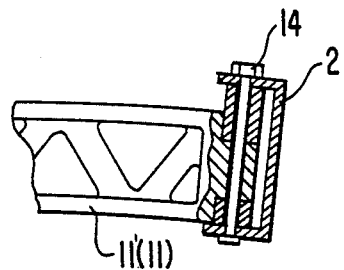
FIG. 10 is a fragmentary, elevational showing the rear end of a truss connected to the rear support of a car with the fixing pin.
Figure 11:
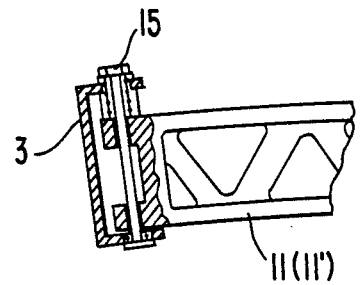
FIG. 11 is a fragmentary, elevational diagram showing the front end of a truss connected to the front support of a car with a movable pin.
Figure 12:
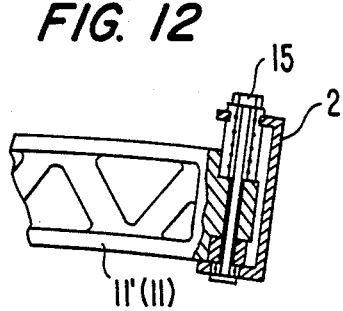
FIG. 12 is a fragmentary, elevational diagram showing the rear end of a truss connected to the rear support of a car with a movable pin.

As seen in FIG. 8, to the connecting portion of the outer sides of flexible trusses, where external pin 13 is inserted, a bush 18 is positioned above the trusses 11, 11' and held in place with the external pin 13. The length of the external pin 13 must be longer than the length of the internal pin 13'. Transverse bar 16 is also positioned on the bush and is connected with the opposite truss also by use of external pin 13.

Figure 16A:
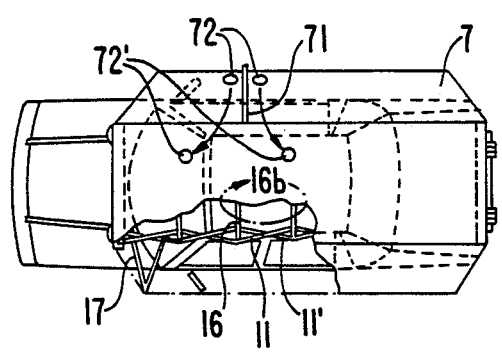
FIG. 16 is a partially cut away top plan view illustrating a cover of the invention covering a car.
Figure 16B:
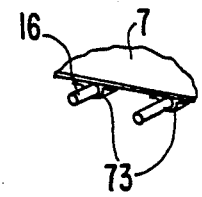

The length of the transverse bar 16 is a little shorter than the width of the back trunk of a car. When the transverse bar carries the cover sheet, as shown in FIG. 16, the transverse bar with the cover sheet extends or constricts according to the extension and the constriction of the flexible major trusses.

Figure 4:
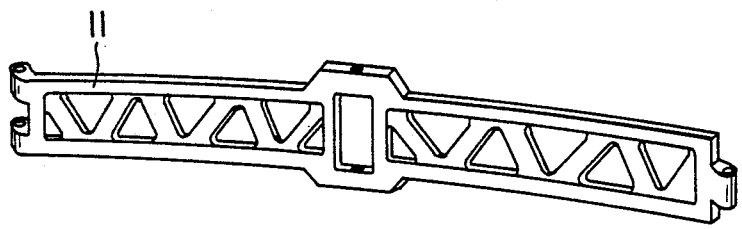
FIG. 4 shows a perspective view of a female arm of the truss.
Figure 5:
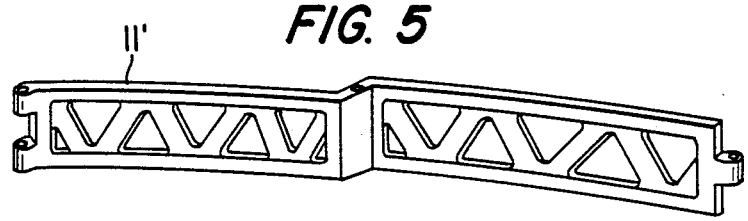
FIG. 5 shows a perspective view of a male arm of the truss.
Figure 6:
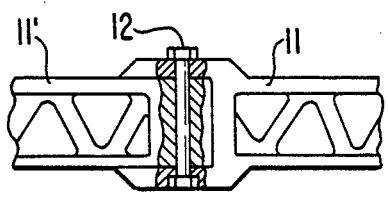
FIG. 6 is a fragmentary, elevational diagram showing the male and female trusses connected with a center pin.
Figure 7:
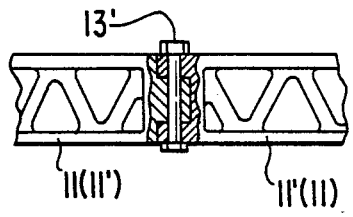
FIG. 7 is a fragmentary, elevational diagram showing the male and female trusses is being connected with an internal pin.
Figure 13:
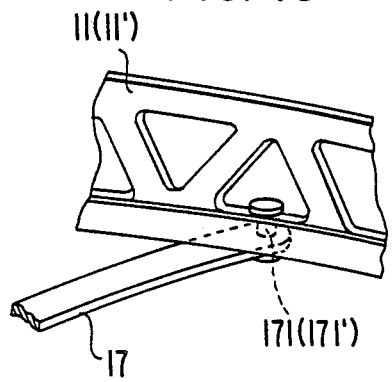
FIG. 13 is a fragmentary perspective view of a truss showing an additional traverse bar connected to the major truss with connecting pin.
Figure 14:
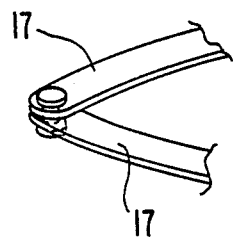
FIG. 14 is a fragmentary perspective view showing two additional transverse bars connected to each other.
Figure 15:
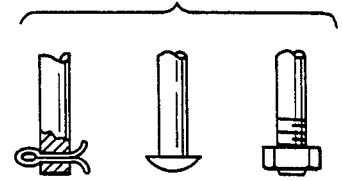
FIG. 15 is an elevational view illustrating various ways of tightening pins such as the center pin, external pin, interval pin, fixing pin, movable pin, and connecting pin.

An additional transverse bar 17 is connected to the internal portion of the individual truss modules 11, 11' with connecting pins 171, 171' around the center pin 12 and extend outward at each side at the end of the flexible major trusses 1, 1 as shown in FIGS. 1, 13 and 4. Though these additional transverse bars 17 are illustrated as two on each truss, totaling four, at the front and rear side of the flexible major truss 1, more than four additional transverse bars 17 may be used, if desired.

The front end and rear end of the flexible major trusses 1 connect to the fixing holes 21, 31 and to the elongated guide holes 22, 32 of the front and rear support beams 2, 3 with fixing pin 14 and movable pin 15.

The fixing holes 21, 31, into which fixing pins 15 may be inserted, perforate both the right and left ends of both the front and rear support beams 2 and 3. The elongated guide holes 22, 33 perforate the middle of both the front and rear support beams 2 and 3, allowing pin 15 to be movably inserted. Fasteners 25, 35, for example, hook and barb tape, clips, or snaps, are attached on the upper or side surface each support beam, to connect the cover sheet.

The holes 36 are perforated in the outer end of the front support beam 3. The poles 8, shown in FIGS. 17 and 18, the handle 34, or the fixing hook 33 may be inserted through holes 36. Fixing hook 33 allows the hooking of the cover to the front of a car.

The male part of the hinge 42 is coupled with the female part of the hinge 41 of the height adjusting base 4. Base 4 and hinge pin 43 attach to the rear support beam 2.

The flexible major trusses and support beams 2, 3, as described above, may be connected with fixing holes 21, 31, by fixing pins 14 and with elongated guide holes 22, 32 by movable pins 15. Cover sheet 7 is inserted into transverse bar 16 of the flexible major trusses 1 and is coupled to fasteners 25, 35, to complete the construction of the car cover.

Cover sheet 7, which is attached to the flexible major truss, is made of the textile fabrics which is water-proof but air permeable, such as tenting material for camping. The sheet 7 is cut to the length of the extended flexible major truss and to 9 width capable of fully covering the car body. Parts complimentary to the fasteners 25, 35 of support beams 2, 3 are attached to both ends of the sheet. Further, the bar-inspecting pocket into which the transverse bar may be inserted is formed at the location of transverse bar 16 of the flexible major trusses. In addition, zipper 71 is positioned to correspond to a location between the front and rear doors of a car, and hook and barb tape 72, 72' is positioned to fasten the separated sheet when the zipper is open in FIGS. 1 and 16.

The connecting or coupling of each component described above such as the individual truss module, the transverse bar, the support beam, etc., by pins should allow free movement between each components. Examples of these elements will be illustrated in the FIGS. from 4 to 15.

Figure 2:
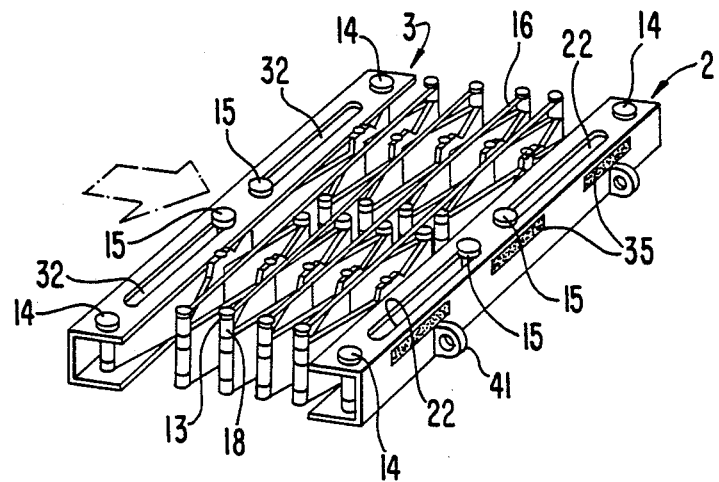
FIG. 2 shows a perspective view of a constricted truss from which the cover sheet is removed.
Figure 3:
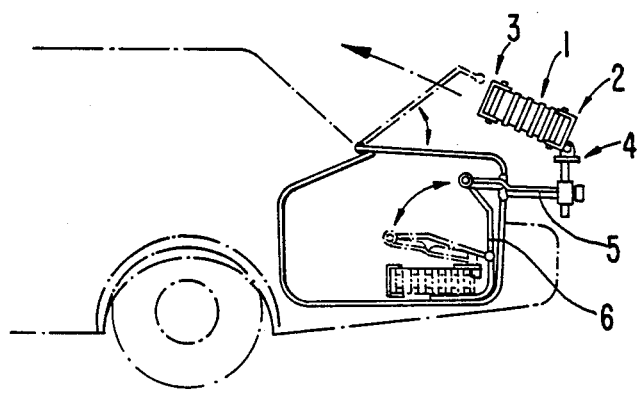
FIG. 3 is a schematic diagram illustrating the drawing out or storing of the truss and cover into or from the truck of a car.

Referring FIGS. 1 to 3, fixing pillar 6 is composed of fixing part 61, for attaching to the bottom of the trunk of a car, and supporting part 62, for supporting the rotatable connecting frame 5. Supporting part 62 is designed so that the upper part of the supporting part may be turned within the trunk by connecting the upper and lower part with the hinge 63. Fixing part 61 is attached to the bottom of the trunk with the fixing bolt 65 through hole 66. Pivot shaft pedestal 64 is positioned on the upper part of fixing part 61.

To use the cover of the invention as a shelter, the body of the cover and fixing pillars 6 are connected by adding the two intermediate members of the rotatable connecting frame 5 and the height adjusting base 4.

Rotatable connecting frame 5 is made of the supporting bars 51 which have supporting seats 52 which in turn may be supported by the rubber packing of the top edge of the trunk of a car. A pivot shaft 53 is positioned at the end of the supporting bars 51 and height adjusting pillar sleeves 54 are positioned at the opposing end of the supporting bars. Tapped holes 55 penetrate to the height adjusting holes and the knobs 56 are inserted therethrough to cause the adjusting of the height adjusting base 4 by tightening them.

The height adjusting base 4 is structured with the female hinge 41 coupling with the male hinge 23 of the supporting beam 2. The height adjusting pillar 42, which moves vertically, is inserted into the height adjusting pillar sleeve 54 of the rotatable connecting frame 5 and, accordingly is part of height adjusting base 4.

The construction of the cover according to the invention is completed by connecting the male hinge 23 to the female hinge 41 of the height adjusting base 4, connecting the rotatable connecting frame 5 and the fixing pillar 6 at the pivot shaft pedestal 64 with the pivot shaft 53, placing the height adjusting pillars 42 of the height adjusting base 4 into the height adjusting pillar sleeves 54 and positioning and tightening the knobs 56.

The various operations of the above-described cover will be explained hereinafter.

FIG. 3 illustrates the cover of the present invention stored within the trunk of a car.

When the covering of a car is required after parking, as shown in FIG. 3, after opening the trunk lid and drawing out the body of a cover together with the rotatable connecting frame 5, the trunk lid is closed. Handles of the front supporting beam 3, are pulled. The flexible major trusses 11, 11' connected between the supporting beams 2 and 3 may be extended causing the movable pins 15 to move in the elongated guide holes 22, 32 to the fixed pin 14. The cover sheet also extends by following the transverse bar 16 and the front support beam 3. The covering of the car body is then attached to the front of the car by hooking within the fixing hooks 33. At this point, though the transverse bars 16 carries the cover sheet to cover the car, the overall width of a car cannot be covered only by these transverse bars. For this reason, additional transverse bars 17 are supplied to protrude at both side and extend the sheet more broadly to cover the overall width of the car. The height adjusting base 4 may be adjusted as necessary.

To open the door or to enter into the car when it is covered, it may be easily done by opening the zippers 71 and raising the cover and connecting to the hook and barb tape 72, 72'.

To uncover the car, the fixing hooks 33 may be released, and the front support beam 3 is pushed toward the trunk of the car. The flexible truss is then constricted in the opposite manner in which the cover was extended. After securing the body of a cover with the fixing hooks 33, it may be put into the trunk and stored. At this point, the additional transverse bar 17 which had been protruding may be folded into the flexible major truss.

Figure 17:
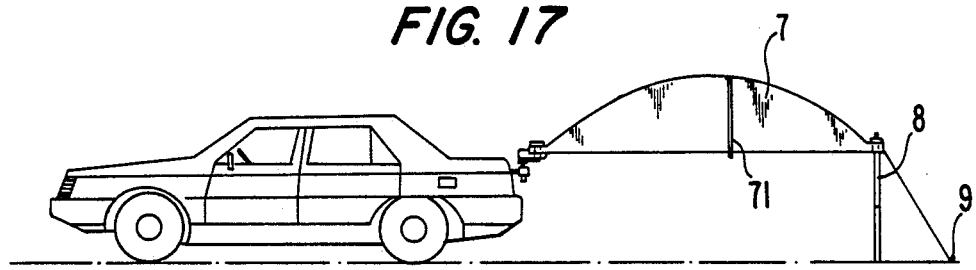
FIG. 17 is a diagram illustrating that a cover of the invention can be utilized as a camping tent by using poles and a car.

FIG. 17 illustrates that the cover can be utilized instead of a camping tent. In this case, the height adjusting base 4 may be withdrawn from the height adjusting pillar sleeve 54 and turned around, approximately 180 degrees and reinserting the height adjusting pillars 42 into the height adjusting pillar sleeves 54 and knobs 56 are tightened. Finally, pole 8 for the tent is inserted into the holes 36 of the support beam 3, pegs 9 are driven into the ground to complete the camping tent.

Figure 18:
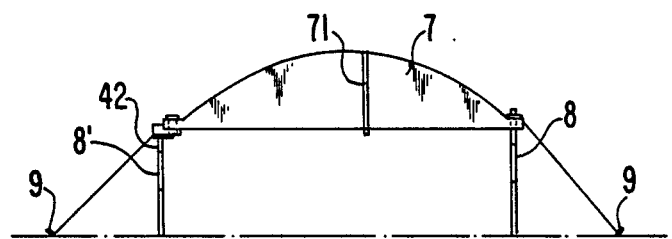
FIG. 18 is a diagram illustrating a cover of the invention utilized as a camping tent by using poles without a car.

To make a simple tent which is not supported by a car, as in FIG. 18, the height adjusting base 4 is drawn out of the height adjusting pillar sleeves 54 then the poles 8, and 8', are inserted respectively into the holes 36, of the front support beam 3 and the height adjusting pillars 42, pegs 9, and 9', are driven into the ground to complete the tent.

I claim:

1. A multipurpose car cover, which stores in a trunk of a car when not in use, comprising:
    a means for attaching the car cover to the trunk;
    a means for rotating the car cover out of the trunk;
    a rear support beam, connected to the means for rotating;
    two flexible major trusses, each having a scissors-like structure, the trusses being disposed in parallel and each being slidably connected on one end to the rear support;
    a front support beam, slidably connected to the end of the flexible trusses opposing the rear support;
    means for connecting the front support to the front of the car; and
    a sheet, carried by the flexible trusses, for covering the car.

2. The multipurpose car cover of claim 1, wherein each of the flexible trusses is comprised of
    a plurality of truss modules, said truss modules being comprised of
        a female arm, having an opening in its center and having a first set of connecting holes, one at the top and one at the bottom of said opening, and a second set of connecting holes at the lateral ends of said female arm;
        a male arm, positioned in said opening of said female arm and having a third set of connecting holes, one at the top and one at the bottom of said male arm, and a fourth set of connecting holes at the lateral ends of said male arms, said first and third sets of connecting holes being aligned;
        two center pins connecting said female arm and said male arm at the first and third sets of holes;
        a plurality of internal pins, interconnecting the truss modules at the second and fourth sets of connecting holes facing toward the other major truss; and
        a plurality of outer pins, interconnecting the truss modules at the second and fourth sets of connecting holes farthest from the other major truss.

3. The multipurpose car cover of claim 1, wherein each of the front and rear support beams having a fixing hole at each of the support beams lateral ends and two guide hole slots positioned along the length of said respective support beams.

4. The multipurpose car cover of claim 3, further comprising four fixing pins, one at each terminal, outer edge of each major truss, for fixedly connecting said major trusses to said support beams at said fixing hole;
    four movable pins, one at each terminal, inner edge of each major truss, for slidably connecting said major trusses to said support beams at said guide hole slots, whereby extension or contraction of the major trusses scissor structure causes said movable pins to slide in said guide hole slots.

5. The multipurpose care covering of claim 1, further comprising a second set of transverse bars, connected on one end thereof to the center pins of the truss modules and on the opposing end thereof to another of said second set of transverse bars, and extending outward from the major trusses on the sides thereof away from the other major truss.

6. The multipurpose car cover of claim 1, wherein said sheet has a zipper positioned thereon, allowing access to the car doors, and means for attaching the sipper edges to the sheet when unzipped.

7. The multipurpose car cover of claim 1, wherein said means for attaching the cover to the trunk comprises at least one fixing pillar, being secured to the interior of the car trunk.

8. The multipurpose car cover of claim 1, wherein said means for rotating the car cover out of the trunk comprises a rotatable connecting frame, attached to the fixing pillar and a height adjusting base, positioned on the rotatable connecting frame.

9. The multipurpose car cover of claim 1, wherein the means for connecting the front support to the front of the car includes hooks.

10. A multipurpose car cover comprising:
   at least one fixing pillar, which attaches to a trunk of a car;
   a rotatable connecting frame, supported by the fixing pillar;
   a height adjusting base, positioned on the rotatable connecting frame;
   two support beams, each having a fixing hole at each of its lateral ends and two guide hole slots positioned along the length of said respective support beams, the first beam being connected to the height adjusting base and the second beam being attachably connected to the front of the car;
   a first and second major truss, positioned in parallel along the car body, connected at each terminal end to said respective support beams, said major trusses having a scissor structure and each being comprised of
   a plurality of truss modules, said truss modules being comprised of
      a female arm, having an opening in its center and having a first set of connecting holes, one at the top and one at the bottom of said opening, and a second set of connecting holes at the lateral ends of said female arm;
      a male arm, positioned in said opening of said female arm and having a third set of connecting holes, one at the top and one at the bottom of said male arm, and a fourth set of connecting holes at the lateral ends of said male arms, said first and third sets of connecting holes being aligned;
      two center pins connecting said female arm and said male arm at the first and third sets of holes; a plurality of internal pins, interconnecting the truss modules at the second and fourth sets of connecting holes facing toward the other major truss;
      a plurality of outer pins, interconnecting the truss module at the second and fourth sets of connecting holes farthest from the other major truss;
   a plurality of transverse bars, interconnecting said outer pins of said first major truss to said second major truss such that said transverse bars are perpendicular to said major trusses and parallel to said support beams;
   four fixing pins, one at each terminal, outer edge of each major truss, for fixedly connecting said major truss to said support beams at said fixing hole;
   four movable pins, one at each terminal, inner edge of each major truss, for slidably connecting said major trusses to said support beams at said guide hole slots, whereby extension or contraction of the major trusses scissor structure causes said movable pins to slide in said guide hole slots; and
   a sheet, having four edges, large enough to cover the car, connected to said support beams at two edges and to the major trusses at said trasverse bars.

11. Use of the multipurpose car cover of claim 10 as a tent, comprising:
   withdrawing the car cover from the trunk;
   withdrawing the height adjusting base from the rotatable connecting frame, rotating the height adjusting base 180 degrees and replacing the height adjusting base in the rotatable connecting frame; extending the car cover away from the car; placing at least one pole into the ground; attaching the front support beam to the pole; tieing rope to the pole; and staking the rope into the ground.

12. Use of the multipurpose car cover of claim 10 as a tent, comprising:
   placing a first set of poles into the ground;
   withdrawing the car cover from the trunk;
   removing the height adjusting base from the rotatable connecting frame;
   attaching the height adjusting base to the first set of poles;
   extending the car cover away from the first set of poles;
   placing a second set of poles into the ground;
   attaching the front support beam to the second set of poles;
   tieing rope to each of the poles; and
   staking the rope into the ground.

* * * * *